Figure 3:
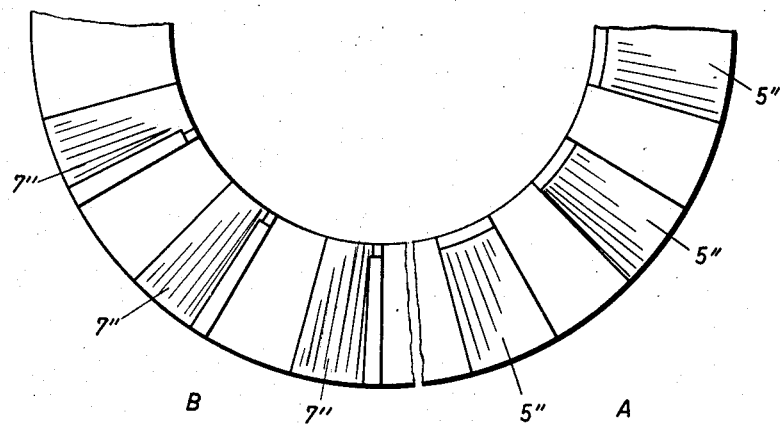

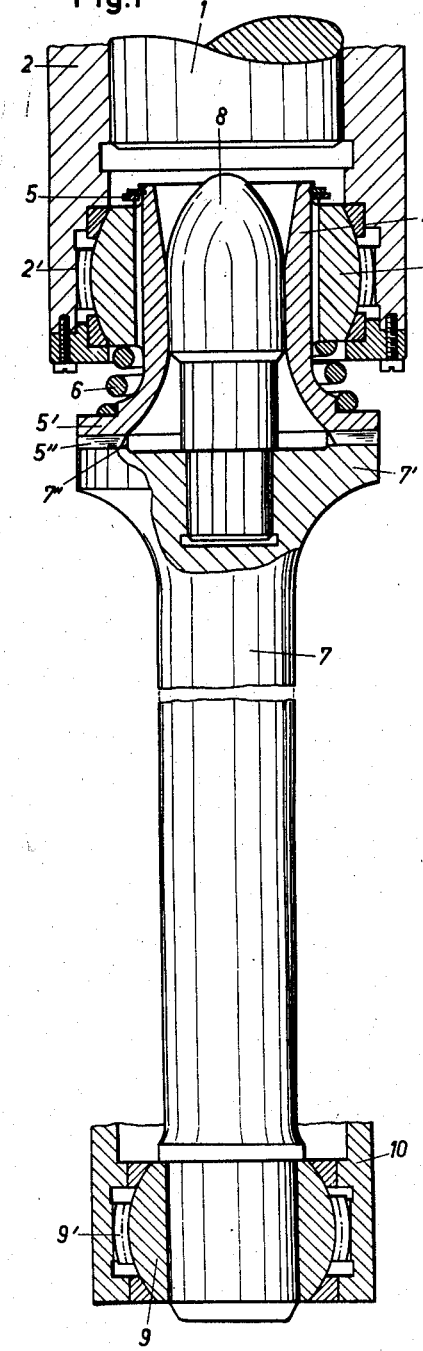
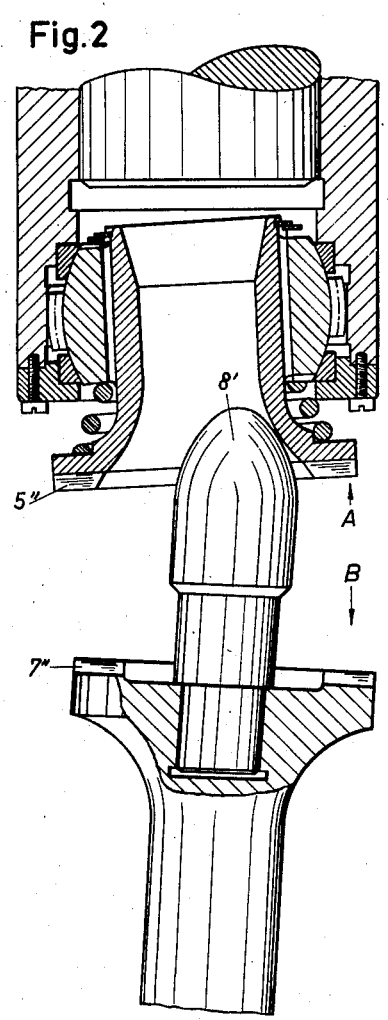

July 7, 1959 K. ALBEDYHL ET AL 2,893,222
ARTICULATED COUPLING
Filed Nov. 4, 1957 2 Sheets-Sheet 2

Inventors
KARL ALBEDYHL
ALBERT BIER
ATTORNEYS

2,893,222
ARTICULATED COUPLING

Karl Albedyhl and Albert Bier, St. Ingbert, Saarland, Germany, assignors to Moeller & Neumann G.m.b.H., St. Ingbert, Saarland, Germany, a German firm Application November 4, 1957, Serial No. 694,369

6 Claims. (Cl. 64—9)

This invention relates to an automatically engageable and disengageable articulated coupling for connecting a driving and a driven member in rolling mills, particularly for connecting a roll neck with a drive spindle.

The rolls of rolling mills are mostly driven by a prime mover through pinions and drive spindles. In service, the rolls are subjected to wear whereby their diameter decreases progressively until they must finally be exchanged against new rolls. From this it results that the center distance of the rolls changes during the service life of the latter whilst the center distance of the pinions remains unchanged. The driving connection between the pinions and the rolls of the roll stand is therefore established by means of drive spindles which on their driven end are articulated to the pinion shafts and at their other end are adapted to be brought into engagement with the roll neck through articulated and disengageable coupling means. In the arrangements known and used hitherto the separation and re-establishment of this connection which becomes necessary when the rolls are being exchanged, is a very time-consuming operation. In most cases several workers must be present at the point of connection between drive spindle and roll in order to supervise and manually assist the coupling of these parts.

It is therefore an object of the invention to provide an articulated coupling for rolling mills which permits automatic and reliable engagement and disengagement of a roll with its associated drive spindle also when the geometrical axis of the roll forms a slight angle with the geometrical axis of the drive spindle.

For this purpose the invention provides an articulated coupling in which the articulation member or the drive spindle presents a bell-mouth extension with a center bore, and the associated drive spindle, respectively the associated articulation member, is provided with a spigot pin which tapers at its end and is adapted to engage in the center bore.

Conveniently the bell-mouth extension and the bore adapted to receive the spigot pin are provided in an axially displaceable coupling sleeve which is subjected to the action of a spring and is mounted rotationally fast, for example in the bore of the articulation member, and on its open bell-mouthed end presents a flange having coupling teeth formed on the end face thereof which are adapted to engage corresponding coupling teeth provided on the end face of the other coupling member.

According to a preferred embodiment of the invention the sliding sleeve is provided with external teeth adapted to engage mating internal teeth of the articulation member.

Figure 4:
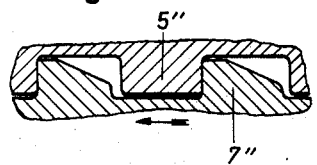

A preferred form of articulated coupling embodying the invention and serving to connect a drive spindle and a roll neck will now be described by way of example only and with reference to the accompanying drawings in which Fig. 1 shows the drive spindle in engagement with the roll neck of a roll (not shown) of a rolling mill;

Fig. 2 shows the same drive spindle disengaged from the roll neck;

Fig. 3 is a front elevational view at a larger scale showing in its right part A the teeth provided on the end face of the sliding sleeve, seen in the direction of arrow A in Fig. 2, and in its left part B the teeth provided on the end face of the drive spindle, seen in the direction of arrow B in Fig. 2, and Fig. 4 shows the engagement of the teeth provided on the end faces of the drive spindle and of the sliding sleeve.

As may be seen from Fig. 1, a sleeve 2 is fast on the roll pin 1 of a roll. Inserted in this sleeve which is provided with spherical internal teeth 2' is an articulation member 3 having corresponding spherical external teeth. This articulation member has the form of a segment of a spere and is rotatable in all directions within narrow limits. On its inner periphery the articulation member 3 is provided with internal teeth adapted to engage with corresponding external teeth provided on the outer periphery of a sliding sleeve 4. This sliding sleeve carries on its end a retaining ring 5 and on its other end it is provided with a flange 5'. This flange 5' presents coupling teeth 5" on its end face. The sliding sleeve has a cylindrical center bore which presents a bell-mouthed enlargement in the direction towards the flange.

A pre-compressed spring 6 is arranged between the flange 5' of the sliding sleeve 4 and the articulation member 3. The movement of this spring in the direction of expansion is limited by the retaining ring 5.

The spindle 7 which establishes the driving connection between the pinion of the pinion stand and the roll of the roll stand also presents a flange 7' on the end facing the roll stand and this flange is likewise provided with coupling teeth 7" on the end face thereof, which are adapted to engage the teeth 5" of the flange 5'.

Centrically arranged on the drive spindle 7 is a spigot pin 8 which fits into the cylindrical bore of the sliding sleeve 4 and is tapered at its front end 8'. This spigot pin serves as a feeler member for the automatic centering of the parts to be coupled.

On its other end the drive spindle 7 is rigidly connected with an articulation member 9 carrying external spherical teeth 9' which in a manner known per se are in engagement with corresponding internal spherical teeth of a sleeve 10. The sleeve 10 is driven in known manner by its associated pinion.

When it is desired to exchange a worn roll, such roll is removed in axial direction (to the right in Fig. 1) together with its sleeve 2 and the associated coupling parts 3, 4.

When a new roll is inserted with the associated sleeve 2 and coupling parts 3, 4, it is advanced in the opposite direction towards the drive spindle 7. Thereby the tapered front end 8' of the spigot pin 8 first enters the bell-mouthed bore of the sliding sleeve 4. When the roll is further advanced towards the spindle 7, the spigot pin 8 automatically centers the spindle 7 with regard to the central axis of the sliding sleeve 4 by penetrating with its cylindrical portion into the cylindrical bore of the sliding sleeve 4.

If the center distance of two rolls is different with regard to the center distance of the corresponding pinions, the articulation member 3 thus automatically adjusts itself to the resulting angular position of the spindle.

The roll with its associated parts is advanced towards the drive spindle until it has reached its final position. In most cases the clutch teeth 5" of the sliding sleeve 4 and the clutch teeth 7" of the drive spindle 7 will not enter into engagement but will abut against each other with their end faces. Thereby the spring 6 is compressed by an amount corresponding to the height of the teeth so that the sliding sleeve 4 will resiliently yield in the direction towards the roll by a corresponding amount. If rotation is now imparted to the drive spindle 7 by the prime mover through the pinion, the abutting end faces of the teeth will slide upon each other until the tops of the teeth of the sliding sleeve 4 come into alignment with the tooth spaces of the drive spindle 7. At this moment the precompressed spring 6 expands and the teeth of the sliding sleeve 4 engage automatically in the tooth spaces of the drive spindle 7 which is then connected rotationally fast with the sliding sleeve 4. As shown in Fig. 4, the driving torque transmitted from the prime mover through the pinion now acts through the coupling teeth 7" of spindle 7 on the coupling teeth 5" of the sliding sleeve 4, and from there via the external teeth of the sliding sleeve 4 on the internal teeth of the articulation member 3, from where it is transmitted through the external teeth of articulation member 3 to the internal teeth of sleeve 2, and from there to the roll.

The coupling described above could also be designed in the reverse manner, so that the bell-mouthed extension with the center bore would be provided on the drive spindle, and the spigot pin on the other coupling member.

The articulation member itself may also be designed in various forms in order to achieve the object of the invention which quite generally comprises all types of articulated couplings in which the articulation member or the drive spindle presents a flange-shaped enlargement into which a mandrel or spigot pin provided on the other member (drive spindle, resp. articulation member) engages in a self-centering manner during installation of a roll.

We claim:

1. An automatically engageable and disengageable articulated coupling connecting a driving and a driven member for rotation about a first axis, comprising an articulation member in the form of a segment of a sphere pivotally mounted about a second axis, transverse to said first axis, on one of said members and adapted to enter into operative engagement with the other one of said members by means of teeth connections whereby said articulation member rotates about said first axis in unison with said driving and said driven members, a bell-mouthed extension with a center bore on one of said members, and a spigot pin tapered on its end and fitting into said center bore, provided on the other one of said members.

2. An articulated coupling as claimed in claim 1, in which said bell-mouthed extension and said center bore for receiving the spigot pin are portions of an axially displaceable coupling sleeve a spring means urging said sleeve toward the member provided with said spigot pin.

3. An articulated coupling as claimed in claim 2, in which said coupling sleeve is supported rotationally fast in a central opening of said articulation member and presenting on its bell-mouthed open end a flange having coupling teeth on the end face thereof, said teeth being adapted to engage with corresponding teeth on the end face of the other coupling member.

4. An articulated coupling as claimed in claim 2, in which said coupling sleeve which carries external teeth adapted to engage corresponding internal teeth provided in a central opening of said articulation member, said coupling sleeve comprising at an end of said bell-mouthed extension a flange having coupling teeth on the end face thereof adapted to engage corresponding coupling teeth provided on the end face of the other coupling member.

5. An articulated coupling as claimed in claim 2, in which said coupling sleeve is supported rotationally fast in a central opening of said articulation member, and on an end of said bell-mouthed extension comprises a flange having coupling teeth on the end face thereof adapted to engage corresponding coupling teeth provided on the end face of the other coupling member, said spring means comprising a spring helically wound and arranged between the flange formed on the bell-mouthed extension and said articulation member, an abutment being provided which limits the displacement of said coupling sleeve in the direction towards the other coupling member.

6. An automatically engageable and disengageable articulated coupling connecting a driving and a driven member for rotation about a first axis, each of said members provided with a set of coupling teeth adapted to engage with each other by axially approaching said members, means for centering said teeth before engaging them, said means comprising a center bore provided on one of said members and a tapered pin provided in the other of said members and fitting in said bore, a bell-mouthed extension surrounding said center bore, said coupling further comprising an articulation member in the form of a segment of a sphere pivotally mounted on one of said members for movement about a second axis transverse to said first axis, said articulation member also being rotatable about said first axis in unison with said members, said articulation member including a portion of said centering means and at least one set of teeth.

References Cited in the file of this patent

UNITED STATES PATENTS

| 1,907,833 | Kurtze | May 9, 1933 |
| 2,610,488 | Teplitz | Sept. 16, 1952 |
| 2,823,527 | Belden et al. | Feb. 8, 1958 |